United States Patent
Grim, III et al.

(10) Patent No.: US 11,023,438 B2
(45) Date of Patent: Jun. 1, 2021

(54) SYSTEM AND METHOD FOR EXPOSING INTERNAL SEARCH INDICES TO INTERNET SEARCH ENGINES

(71) Applicant: INTERNATIONAL BUSINESS MACHINES CORPORATION, Armonk, NY (US)

(72) Inventors: Clifton E. Grim, III, Seabrook, TX (US); Christopher I. Schmidt, Friendswood, TX (US); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 16/538,417

(22) Filed: Aug. 12, 2019

(65) Prior Publication Data

US 2019/0361858 A1    Nov. 28, 2019

Related U.S. Application Data

(63) Continuation of application No. 15/274,054, filed on Sep. 23, 2016, now Pat. No. 10,585,866, which is a
(Continued)

(51) Int. Cl.
*G06F 16/22* (2019.01)
*G06F 16/951* (2019.01)
(Continued)

(52) U.S. Cl.
CPC ........ *G06F 16/2228* (2019.01); *G06F 16/951* (2019.01); *G06F 16/9537* (2019.01); *G06F 16/9558* (2019.01); *G06F 16/986* (2019.01)

(58) Field of Classification Search
CPC .................................................. G06F 16/2228
(Continued)

(56) References Cited

U.S. PATENT DOCUMENTS

| 5,629,980 | A | 5/1997 | Stefik et al. |
| 5,634,012 | A | 5/1997 | Stefik et al. |

(Continued)

FOREIGN PATENT DOCUMENTS

| EP | 1143349 | 10/2001 |
| WO | 0229516 | 4/2002 |

OTHER PUBLICATIONS

M. Kobayashi, et al., "Information Retrieval on the Web", ACM Computing Surveys, vol. '32, No. 2, Jun. 2000, DD. 145-173.
(Continued)

*Primary Examiner* — Syling Yen
(74) *Attorney, Agent, or Firm* — James Nock; Andrew M. Calderon; Roberts Calderon Safran & Cole, P.C.

(57) ABSTRACT

A system and method for exposing internal search indices to Internet search engines. The internal search indices are exposed to external search engines in such a way that the data may be segregated into at least two types including one layer of search data specifically for the search engines, and another for potential users of the application. This significantly improves the probability of discovery by search engines and also provides for presentation of discovered content to users in a manner consistent with the content itself, or consistent with the intended controls or presentations established by the content's owner. The system and method also includes one or more components that reproduce information about IP in a format that search engines can recognize and locate.

11 Claims, 7 Drawing Sheets

Related U.S. Application Data continuation of application No. 14/492,121, filed on Sep. 22, 2014, now Pat. No. 9,471,702, which is a continuation of application No. 11/034,492, filed on Jan. 13, 2005, now Pat. No. 8,874,544.

(51) Int. Cl.
  *G06F 16/958* (2019.01)
  *G06F 16/9537* (2019.01)
  *G06F 16/955* (2019.01)

(58) Field of Classification Search
  USPC .......................................................... 707/707
  See application file for complete search history.

(56) References Cited

U.S. PATENT DOCUMENTS

| | | | |
|---|---|---|---|
| 5,715,403 A | 2/1998 | Stefik | |
| 5,892,900 A | 4/1999 | Ginter et al. | |
| 5,910,987 A | 6/1999 | Ginter et al. | |
| 5,910,988 A | 6/1999 | Ballard | |
| 6,105,131 A | 8/2000 | Carroll | |
| 6,182,050 B1 | 1/2001 | Ballard | |
| 6,216,229 B1 | 4/2001 | Fischer | |
| 6,219,669 B1* | 4/2001 | Haff | H04L 29/06 |
| 6,226,630 B1 | 5/2001 | Billmers | |
| 6,247,127 B1 | 6/2001 | Vandergeest | |
| 6,334,109 B1 | 12/2001 | Kanevsky et al. | |
| 6,338,050 B1 | 1/2002 | Conklin et al. | |
| 6,401,118 B1 | 6/2002 | Thomas | |
| 6,438,690 B1 | 8/2002 | Patel et al. | |
| 6,490,575 B1 | 12/2002 | Berstis | |
| 6,681,223 B1 | 1/2004 | Sundaresan | |
| 6,728,702 B1 | 4/2004 | Subramaniam et al. | |
| 6,993,326 B2 | 1/2006 | Link, II et al. | |
| 7,013,388 B2 | 3/2006 | Fisk et al. | |
| 7,120,800 B2 | 10/2006 | Ginter et al. | |
| 7,124,302 B2 | 10/2006 | Ginter et al. | |
| 7,133,845 B1 | 11/2006 | Ginter et al. | |
| 7,213,005 B2 | 5/2007 | Mourad et al. | |
| 7,222,163 B1* | 5/2007 | Girouard | G11B 27/28 375/E7.025 |
| 7,243,082 B1* | 7/2007 | Forlai | G06Q 20/042 705/35 |
| 7,249,059 B2 | 7/2007 | Dean et al. | |
| 7,272,572 B1 | 9/2007 | Pienkos | |
| 7,386,460 B1 | 6/2008 | Frank et al. | |
| 8,051,109 B2 | 11/2011 | Engel | |
| 8,484,177 B2 | 7/2013 | Lee | |
| 2001/0007979 A1 | 7/2001 | Teshima | |
| 2001/0025255 A1 | 9/2001 | Gaudian | |
| 2001/0049651 A1 | 12/2001 | Selleck | |
| 2001/0049707 A1 | 12/2001 | Tran | |
| 2002/0004775 A1 | 1/2002 | Kossovsky et al. | |
| 2002/0046038 A1 | 4/2002 | Prokoski | |
| 2002/0046127 A1 | 4/2002 | Reding et al. | |
| 2002/0107027 A1 | 8/2002 | O'Neil | |
| 2002/0107803 A1 | 8/2002 | Lisanke et al. | |
| 2002/0107812 A1 | 8/2002 | Schimitzek | |
| 2002/0112153 A1 | 8/2002 | Wu et al. | |
| 2002/0112162 A1 | 8/2002 | Cocotis et al. | |
| 2002/0128935 A1 | 9/2002 | White et al. | |
| 2002/0183867 A1 | 12/2002 | Gupta et al. | |
| 2002/0188841 A1* | 12/2002 | Jones | G06K 9/00442 713/153 |
| 2003/0065642 A1* | 4/2003 | Zee | G06Q 50/184 |
| 2003/0079133 A1 | 4/2003 | Breiter et al. | |
| 2003/0083961 A1 | 5/2003 | Bezos et al. | |
| 2003/0131005 A1 | 7/2003 | Berry | |
| 2003/0177361 A1* | 9/2003 | Wheeler | H04L 63/0428 713/176 |
| 2003/0191716 A1 | 10/2003 | Woods et al. | |
| 2003/0204447 A1 | 10/2003 | Dalzell et al. | |
| 2003/0204449 A1 | 10/2003 | Kotas et al. | |
| 2003/0225693 A1 | 12/2003 | Ballard et al. | |
| 2004/0030683 A1* | 2/2004 | Evans | G06F 16/951 |
| 2004/0221920 A1 | 11/2004 | Ferguson et al. | |
| 2005/0210009 A1 | 9/2005 | Tran | |
| 2006/0069611 A1 | 3/2006 | Litt et al. | |
| 2006/0085344 A1 | 4/2006 | Grim, III et al. | |
| 2006/0085360 A1 | 4/2006 | Grim, III et al. | |
| 2007/0118749 A1* | 5/2007 | Hagn | G06Q 30/06 713/173 |
| 2008/0027830 A1* | 1/2008 | Johnson | G06Q 30/0625 705/14.68 |
| 2010/0161400 A1* | 6/2010 | Snodgrass | G06Q 30/02 705/14.16 |

OTHER PUBLICATIONS

D. Dreilinger, et al., "Experiences with Selecting Search Engines Using Metasearch", ACM Transactioris on Information Systems, vol. 15, No. 3, Jul. 1997, DD. 195-222.

D. Scott, et al., "Creating a Massive Master Index for HTML and Print", SIGDOC 2002, pp. 186-193.

C. Watters, et al., "GeoSearcher Location-Based Ranking of Search Engine Results", Journal of the American Society for Information Science and Technology, vol. 54, No. 2, pp. 1400-151, 2003.

Y. Liang et al., "Enhancing XML Data Processing in Relational System with Indices", Advances in Web-Age Information Management. Second International Conference, WAIM 2001. Proceedings (Lecture Notes in Computer Science, vol. 2118), 168-175, 2001.

F. Bastani et al., "A High-Assurance Measurement Repository System", Proceedings Fifth IEEE International Symposium on High Assurance Systems Engineering (HASE 2000), pp. 265-272.

S. Ye et al., "SCENS: a System for the Mediated Sharing of Sensitive Data", Proceedings of the 2003 Joint Conference on Digital Libraries, 3 pp.

K. Seo et al., "Public -Key Infrastructure for the Secure Border Gateway Protocol (S-BGP)", IEEE, 2001, pp. 239-253.

S. Capkun et al., "Mobility Helps Security in AD Hoc Networks", MobiHoc 2003, pp. 46-56.

L. Zhou et al., "COCA: A Secure Distributed Online Certification Authority", ACM Transactions on Computer Systems, vol. 20, No. 4, Nov. 2002, pp. 329-368.

Notice of Allowance dated Oct. 28, 2019 in related U.S. Appl. No. 15/274,054, 5 pages.

* cited by examiner

SYSTEM AND METHOD FOR EXPOSING INTERNAL SEARCH INDICES TO INTERNET SEARCH ENGINES

FIELD OF THE INVENTION

The invention generally relates to a system and method for exposing search indices and, more particularly, a system and method for exposing internal search indices to Internet search engines.

BACKGROUND

Applications accessible via networks such as the World Wide Web (WWW) typically incorporate internal search indices to allow users to find content when performing searches, for example, on topical subjects or keywords. Content from the applications are often incorporated by outside search engines, thus enabling potential users that do not know about the application to find and utilize the application.

The use of Internet search engines has become both a boon and a hindrance to Internet users. Many topics can be researched via these search engines, but they have limitations. These limitations are becoming increasingly apparent as Internet content becomes more dynamic. By example, search engines normally discover content by following links and generating indices from the textual content contained within the content. This technique does not work properly with certain controlled applications such as, for example, an Information Marketplace due to the interface people use to discover subject matter or intellectual property (IP).

Since modem web applications often hinder the ability for search engines to discover content because of their level of dynamic information, new content is often undiscovered in a timely fashion when a user searches. For example, information that is frequently changing or undergoing frequent updates may be prone to fewer hits by search engines. Further, content that is protected or restricted in certain fashions by the content owners may be unreachable or unpresentable to users in a proper context as intended by the content's owner. Thus, both search engines and users may each have undesirable limitations that may adversely influence discovery or proper use of the content.

Therefore, there is a need to present IP or other content within a web site such as an Information Marketplace in a manner such that search engines can effectively and reliably index the internal search indices. At the same time, users who enter the marketplace through a search engine should be presented with the same interface that a user entering the marketplace normally would see, which currently does not occur.

SUMMARY

In an aspect of the invention, a method of facilitating on-line searching is provided. The method comprises the steps of generating one or more metadata files having keyword value pairs from indices to intellectual property at a web site and storing the one or more metadata files as hyper-text markup files (HTML) in a directory accessible through the Internet. The method also includes creating a master index file containing one or more links to each of the one or more metafiles and accessing at least one of the one or more metafiles via the one or more links to locate the intellectual property for commercial or private use.

In another aspect of the invention, a method of exposing search indices is provided. The method comprises the steps of creating one or more metadata files having keyword value pairs from the indices of an information marketplace having intellectual property and storing the one or more metadata files in a directory accessible through a network. The method also includes the steps of creating a master index file containing one or more links to each of the one or more metafiles and accessing at least one of the one or more metafiles via the one or more links to locate the intellectual property for a transaction, commercial use or a private use.

In another aspect of the invention, a system for facilitating on-line searching is provided. The system comprises means for generating one or more metadata files having keyword value pairs from indices to intellectual property at a web site and means for storing the one or more metadata files in a directory accessible on-line. The system also comprises means for creating a master index file containing one or more links to each of the one or more metafiles and means for accessing at least one of the one or more metafiles via the one or more links to locate the intellectual property for at least any one of a transaction, a commercial use and a private use.

In another aspect, a computer program product comprising a computer usable medium having readable program code embodied in the medium is provided. The computer program product includes at least one component to create one or more metadata files having keyword value pairs from the indices of an information marketplace having intellectual property. The component may also store the one or more metadata files in a directory accessible through a network, create a master index file containing one or more links to each of the metafiles and access at least one of the metafiles via the one or more links to locate the intellectual property for at least any one of a transaction, commercial use, and a private use.

DETAILED DESCRIPTION

Figure 1:
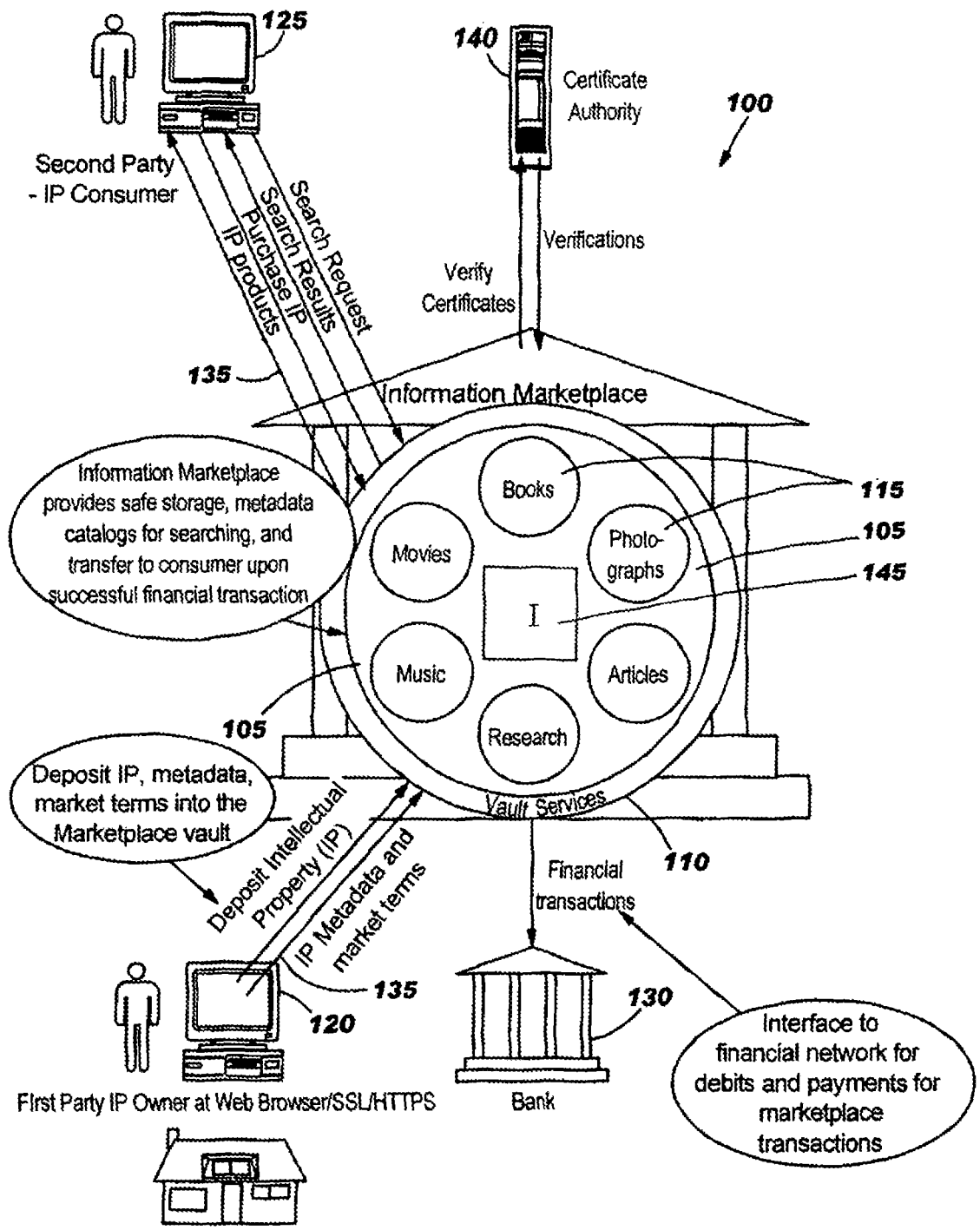
FIG. 1 is an exemplary overview of an embodiment of an Information Marketplace (IM).

This invention is generally directed to a system and method for exposing internal search indices to Internet search engines. The internal search indices are exposed to external search engines in such a way that the data may be segregated into at least two types including: one layer of search data specifically for the search engines, and another for potential users of the application. This significantly improves the probability of discovery by search engines and also provides for presentation of discovered content to users in a manner consistent with the content, itself, or consistent with the intended controls or presentations established by the content's owner.

The system of the invention also includes one or more components that reproduce information about IP in a format that search engines can recognize and locate. The component(s) also forwards users coming through the search engines to the actual IP graphical user interface (GUI), instead of the files that the search engine discovered. This allows control over the information that search engines see/view, while ensuring that a user's interface to the system stays constant.

The system and method of the invention is explained in relation to an Information Marketplace (IM) for which the internal search indices are to be exposed in accordance with the invention. However, the system and method may also be applicable to other information distribution systems, as well, such as webs sites that wish to provide enhanced exposure of internal content. An IM may also provide for the owner of the IP to receive compensation for the use or sale of IP, thus, in effect, the IP becomes a valuable commodity.

IP producers may create information like digital photographs, music, movies, eBooks, composition, research, or the like. The IM provides for the IP producer to bring their creations to an IM that provides ability for IP producers to advertise and sell their material. The IM provides for the safety and security of the IP, and manages the interaction of a buyer and seller by facilitating finding information (i.e., IP) by the buyer. The IM may also handle the financial transaction between the IP owner and the buyer, and may also facilitate transport of the IP product to the buyer/consumer. In this way, the system and method of the invention enables IP producers to sell their own intellectual wares.

By identifying search agents that connect to the IM, the system segregates what information agents receive and what actual users of the system see and use. Requests from search agents may be forwarded to a separate directory with metadata about information in the marketplace. The IM is configured to disallow search agents from searching any directory other than this directory, which contains a set of files. There is a file for each IP stored in the system, and it contains keyword information on the IP. There is also an index file that contains links to each of the IP metadata files in the directory. This allows search agents to include the IP keyword data in their own indices.

When a person uses a search agent that has indexed the marketplace, there is a chance that a search may result in a hit on an item in the system. The link that the search agent provides to the user is the link to the metafile that the search agent indexed originally. To ensure that the user is given a proper interface to see items within the marketplace, the page automatically forwards the user to the real (dynamic) page describing the IP satisfying the search. At this point, the user may be asked to log into the Information Marketplace.

FIG. 1 is an exemplary overview of an embodiment of an Information Marketplace (IM). An IM, generally denoted by reference numeral 100, provides for an information infrastructure to secure and conditionally provide access to stored IP information. The IM 100 employs data storage 105 and security technologies to provide a secure storage mechanism for a user's IP, such as for example, books, movies, articles, music, research, photographs, inventions, software, or the like. The data storage 105 may be one or more physical databases and, in embodiments, may include the databases protected by layered security measures such as firewalls. This secured storage mechanism and structure and associated services are known as an information vault, or simply, a vault. The data storage 105 may also include various indices 145 which provide pointers to the IP within the vault.

A computer system 120 (e.g., a personal computer) may be employed by a user to read or remove IP from the vault or to deposit IP information to the vault over a network 125.

A set of vault of services 110 may be built on the IM's secure storage, to allow users to create accounts, deposit information in any electronic form, and read or remove the information. Information may be stored in the vault 105 and encrypted by the vault 105. In addition, the ™ vault services 110 are provided to allow a user (e.g., an IP producer) to specify conditions, in a secure way via technologies of the existing public key infrastructure (PKI), so that a second party 125 (e.g., a consumer of IP) may have read access to certain, sharable portions of the user's IP.

Using this approach, the first party 120 may provide the second party 125 permission to read an agreed upon set of IP such as articles, research, books, music, video, data or the like. As a trusted third party for information, then, the vault 105 of ™ 100 significantly contributes to the elimination of the escalating dangers of theft, and significantly increases commercial availability of the IP overall. The IM 100 may also provide for financial transactions and payment collection upon sale of the IP, as denoted by reference numeral 130.

Also included are vault services 110 for accessing and updating the vault 105, one or more data objects 115 such as files containing research, music, movies, books, contact management control data, telephone numbers, birthday information, family names, email addresses, or other personal data. The system may also include devices used by users of the vault who may employ computers, personal digital assistants (PDAs), telephones, or the like.

A certificate authority 140 may create an authorized certificate (e.g., a digital certificate) for any user of the system which may be presented during transactions to facilitate authenticating a user. Accesses to the vault typically use the first and/or second party's public keys as identification along with the authorized certificate. To share information with a second party, a contract data token specifying the two parties' public keys may be created and digitally signed by the first party's private key to ensure that access to private information is not propagated beyond the second party. This dual key mechanism is a typical way to authenticate a transaction, of which an example of an implementation may be found in U.S. Pat. No. 7,587,366, incorporated by reference herein.

Figure 2A:
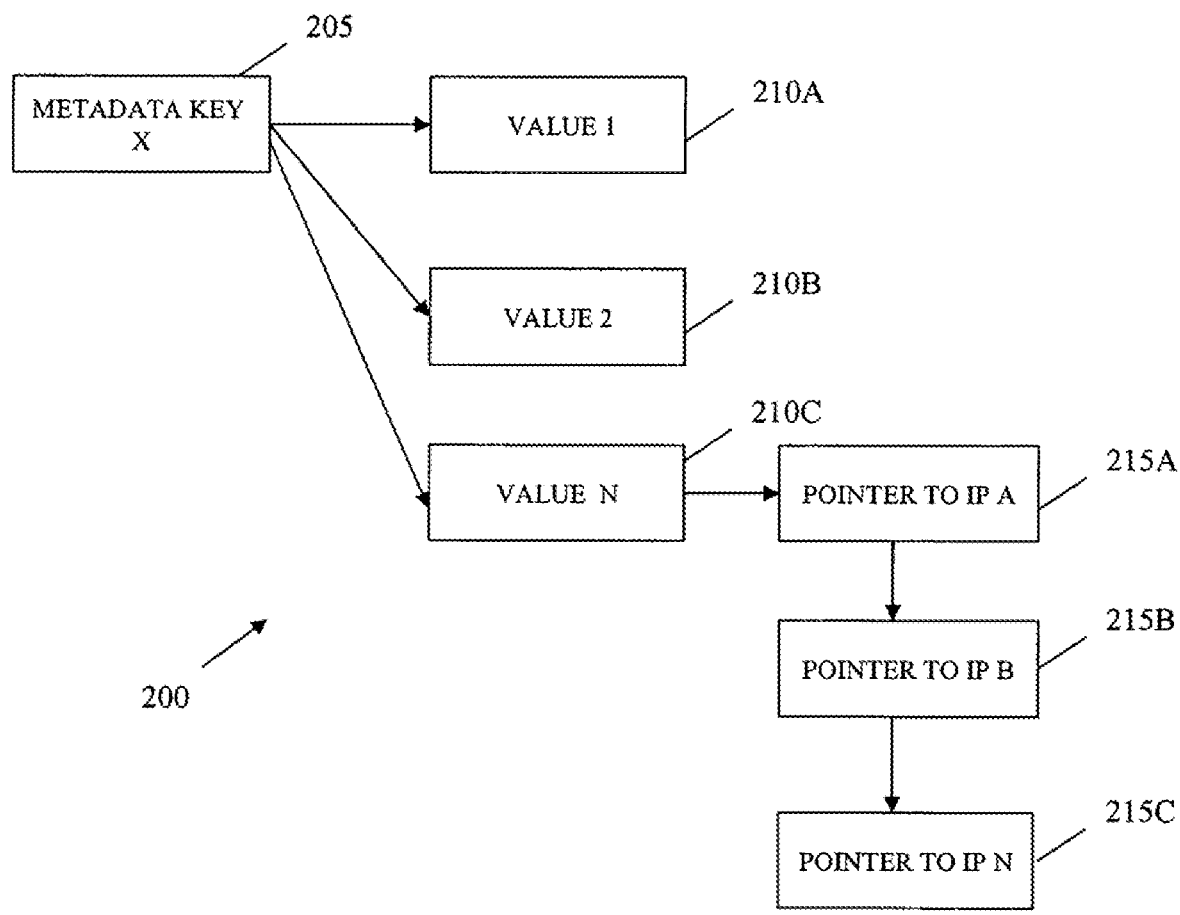
FIG. 2A is an illustrative embodiment of indices to IP typically stored in the vault of the Information Marketplace.

FIG. 2A is an illustrative embodiment of indices (e.g., indices 145) to IP typically stored in the vault of the IM, generally denoted as reference numeral 200. The one or more indices for the information marketplace may be collections of key/value pairs and pointer(s) to IP stored within the IM 100 vault. For example, metadata key X, 205, may link to associated values 210a-210c, each value 210a-210b reflecting a distinctive type of data such as, for example, movies, plain text, music, pictures, or the like. Further, the values 210a-210c may also categorize IP by genre such as "jazz', "classical", "rock and roll", or other types of music, for example. Each value 210a-210c may link to a list of one or more pointers 215a-215c to individual IP objects. In embodiments, the order of the list may reflect the popularity of IP within the list (e.g., consumption statistics, such as the number of sells and views for a particular IP, may promote the IP higher in the list).

The individual indices may have a core set of metadata, or a template that pertains to a type of data. The template may map to standard metadata that the IP may have within the vault. In addition to the core templates, additional metadata pairs may be created to specify individual IP more thoroughly.

Figure 2B:
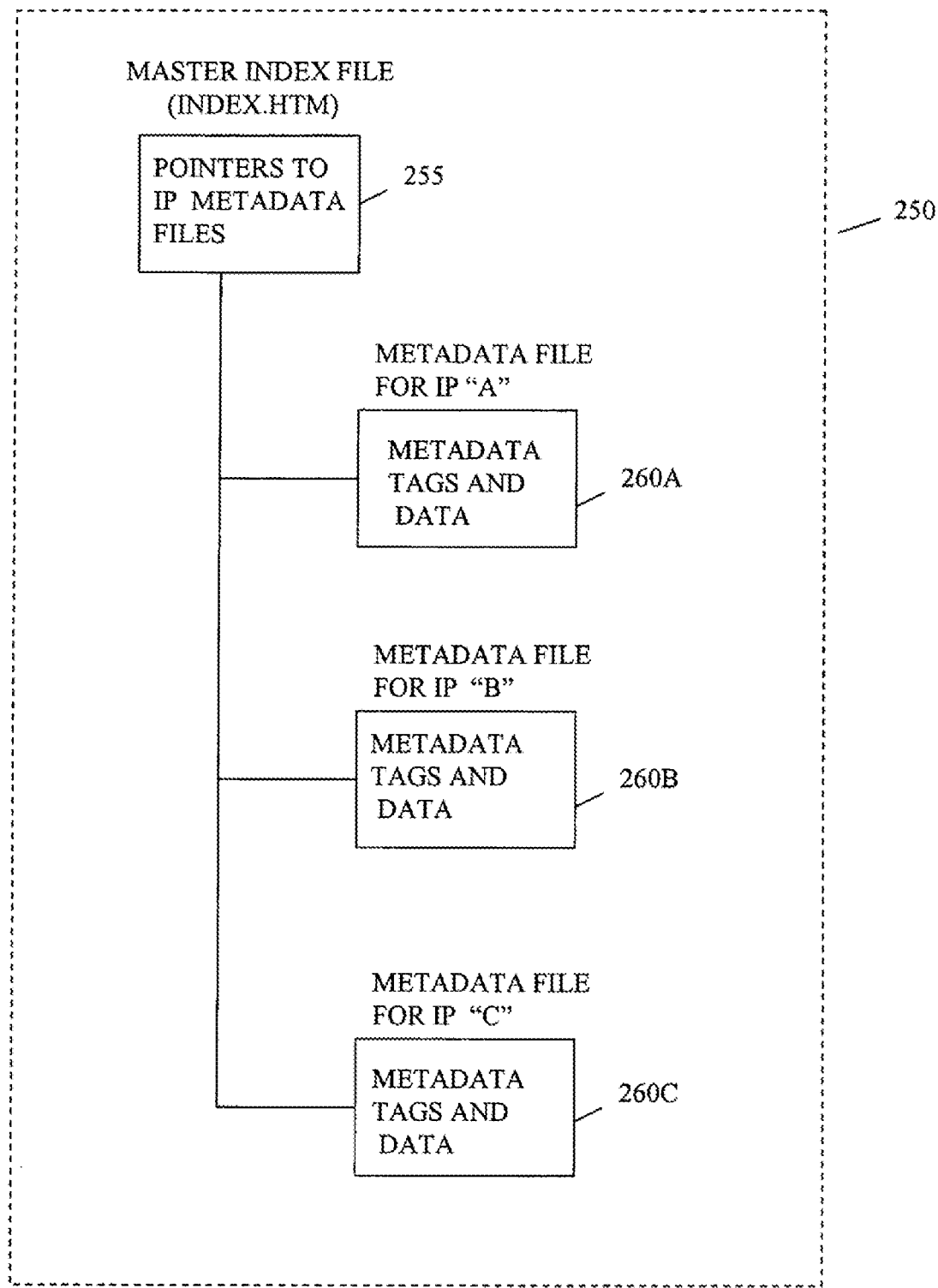
FIG. 2B is an illustrative embodiment of a searchable directory.

FIG. 2B is an illustrative embodiment of a searchable directory, denoted by reference humeral 250. The searchable directory includes one or more metadata files 260A-260C that may be created for each IP (e.g., "A", "B", "C", respectively) for access by web search engine crawlers, or the like. A master index file 255 may be created to link to all the IP metadata files to facilitate search engine crawlers in finding the metadata about each IP in the vault of the Information marketplace 100. This searchable directory 250 may be an Internet accessible web site managed by or associated with the Information Marketplace 100.

Figure 3:
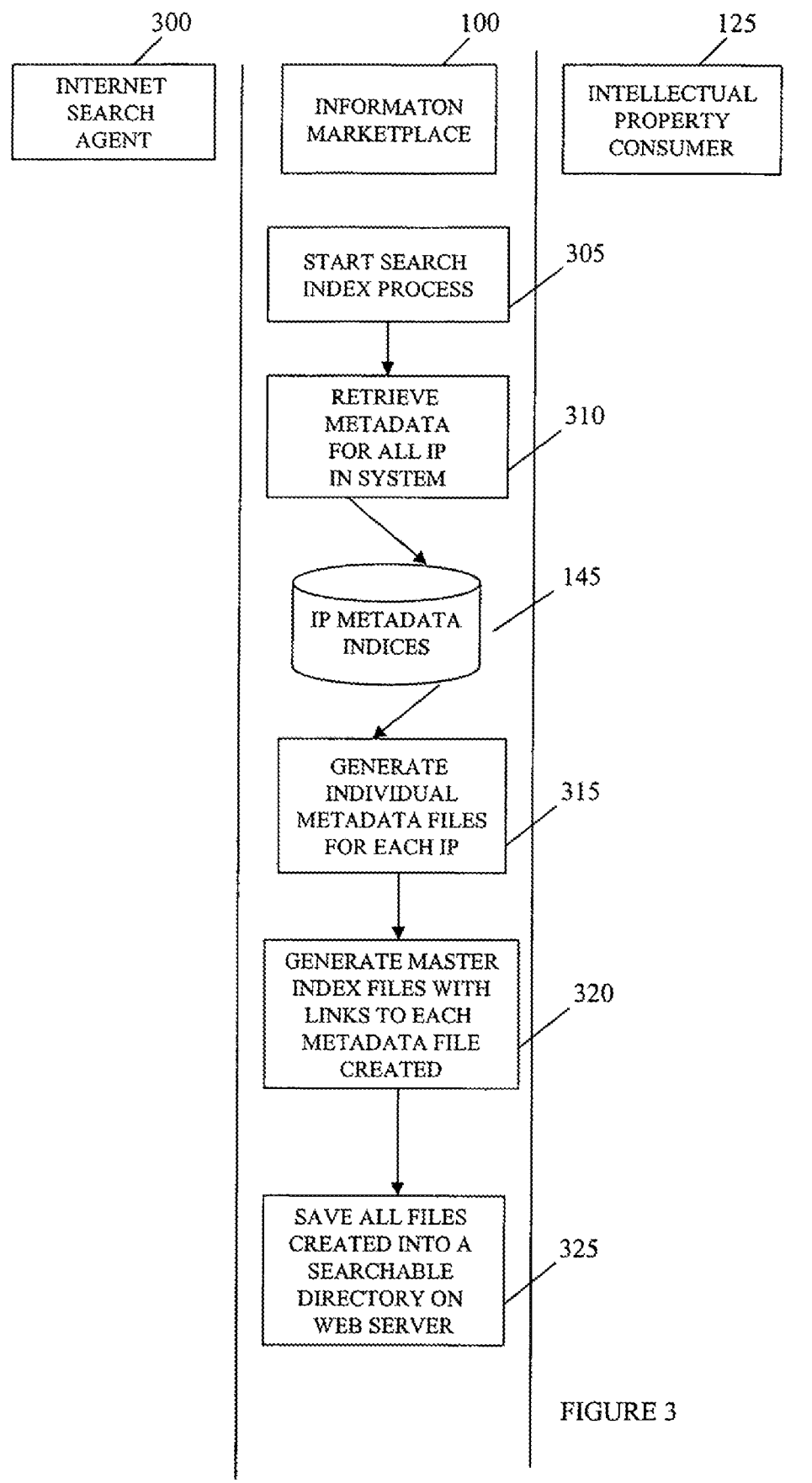
FIG. 3 is a swim lane diagram of an embodiment showing steps of creating IP metadata files for outside search engines.

FIG. 3 is a swim lane diagram of an embodiment showing steps of creating IP metadata files for outside search engines, starting at step 305. "Swim lane" diagrams may be used to show the relationship between the various "actors" in the processes and to define the steps involved in the processes. FIG. 3 (and all the other Figures employing swim lane diagrams) may equally represent a high-level block diagram of components of the invention implementing the steps thereof. The steps of FIG. 3 (and all the other Figures employing swim lane diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 3 (and the other swim lane diagrams) may also be implemented by the embodiment of FIG. 1.

At step 305, a periodic process begins that searches the IM indexes. At step 310, metadata may be retrieved from the IP metadata indices (e.g. indices 145) for all or portions of the IP in the IM. At step 315, individual metadata files may be generated for each IP. This may include collating all keyword data pairs for each IP and creating a separate hyper-text markup language (HTML) file for each IP. The HTML file may contain a meta tag for notifying search robots not to follow and index (e.g., META name="robots"), and another meta tag containing the keyword pairs (e.g., META name="keyword"). These HTML files may be written to a specific directory that may be accessible through the Internet.

At step 320, a master index file may be generated having individual links to each metadata file created. A meta tag "ROBOTS" entry in this master file informs search agents to follow the links, but not to index the master file, itself (e.g., a CONTENT entry of "FOLLOW,NOINDEX"). At step 325, all master index files may be saved into a searchable directory on an appropriate web server.

Figure 4:
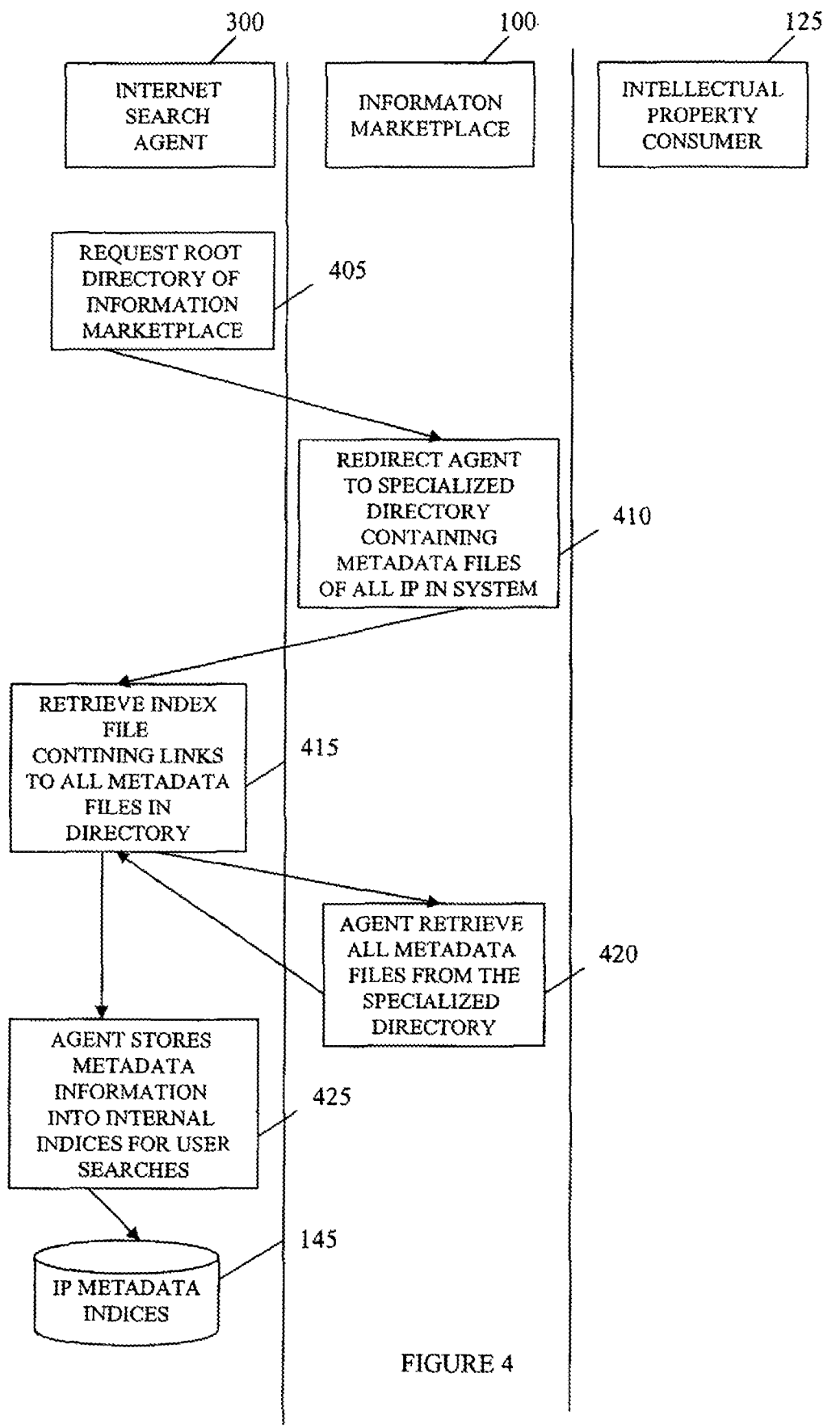
FIG. 4 is a swim lane diagram of an embodiment showing steps of processing search agents requests.

FIG. 4 is a swim lane diagram of an embodiment showing steps of processing search agents requests, starting at step 405 where a search agent requests a root directory of the IM. At step 410, the request may be redirected to the searchable directory (e.g., the one or more master index files) containing metadata files of the indexed IP in the IM, which is typically not the primary page(s) that consumers use. The directory typically contains an HTML file for each IP in the IM containing metadata. The directory may also contain the master index file with links to each of the metadata documents thereby permitting search engines to discover meta information for all IP in the IM.

At step 415, the master index file containing links to the metadata files in the searchable directory may be retrieved. At step 420, the search agent may retrieve the metadata files specified in the searchable directory of the IM. At step 425, the search agent may store the metadata information into internal indices (e.g., indices 145) for user searches. URLs to individual metadata documents may also be added to the search engine index of searchable files.

Figure 5A:
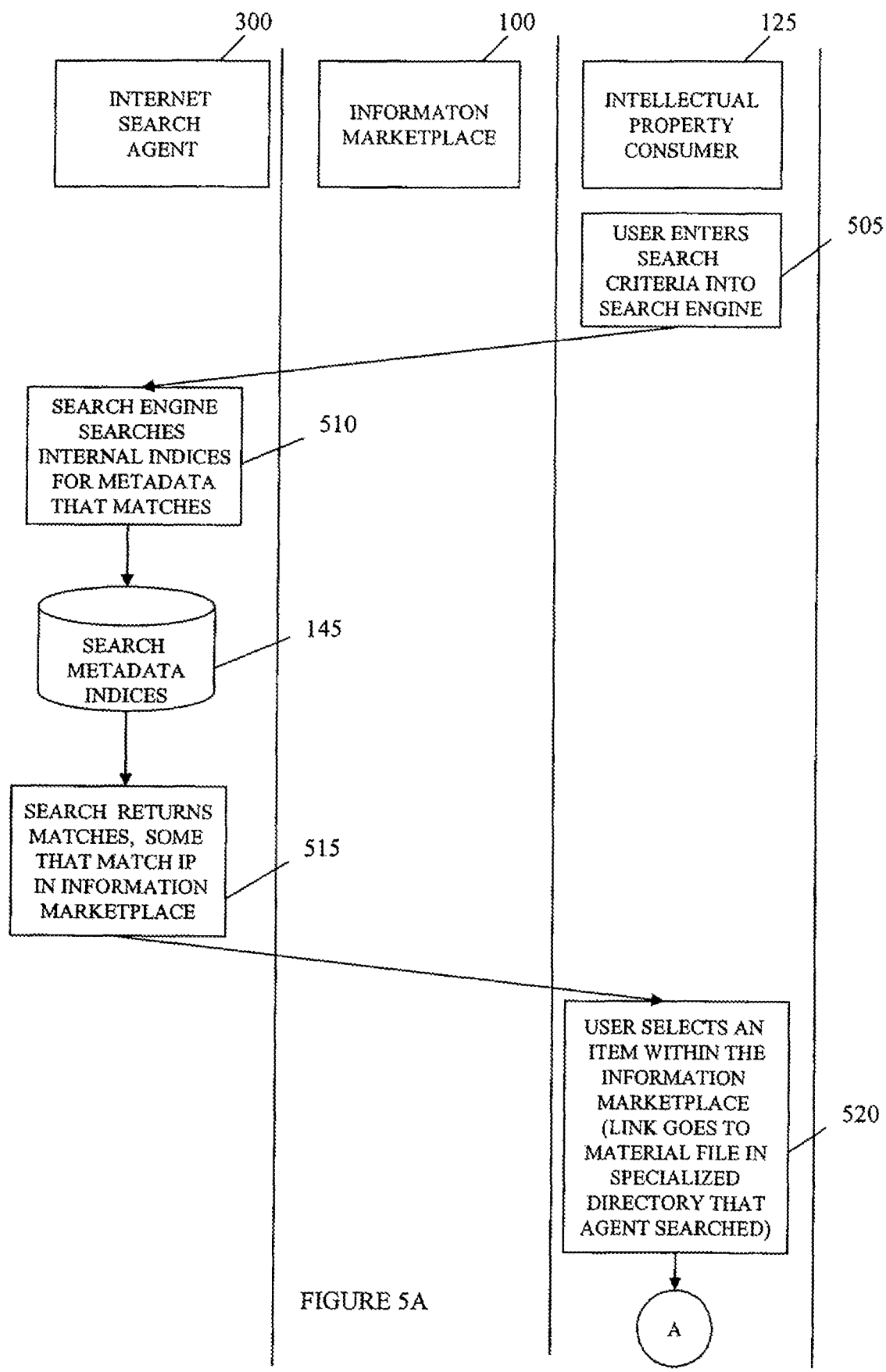
FIGS. 5A and 5B are swim lane diagrams of an embodiment showing steps of a user entering the Information Marketplace through an outside search site.
Figure 5B:
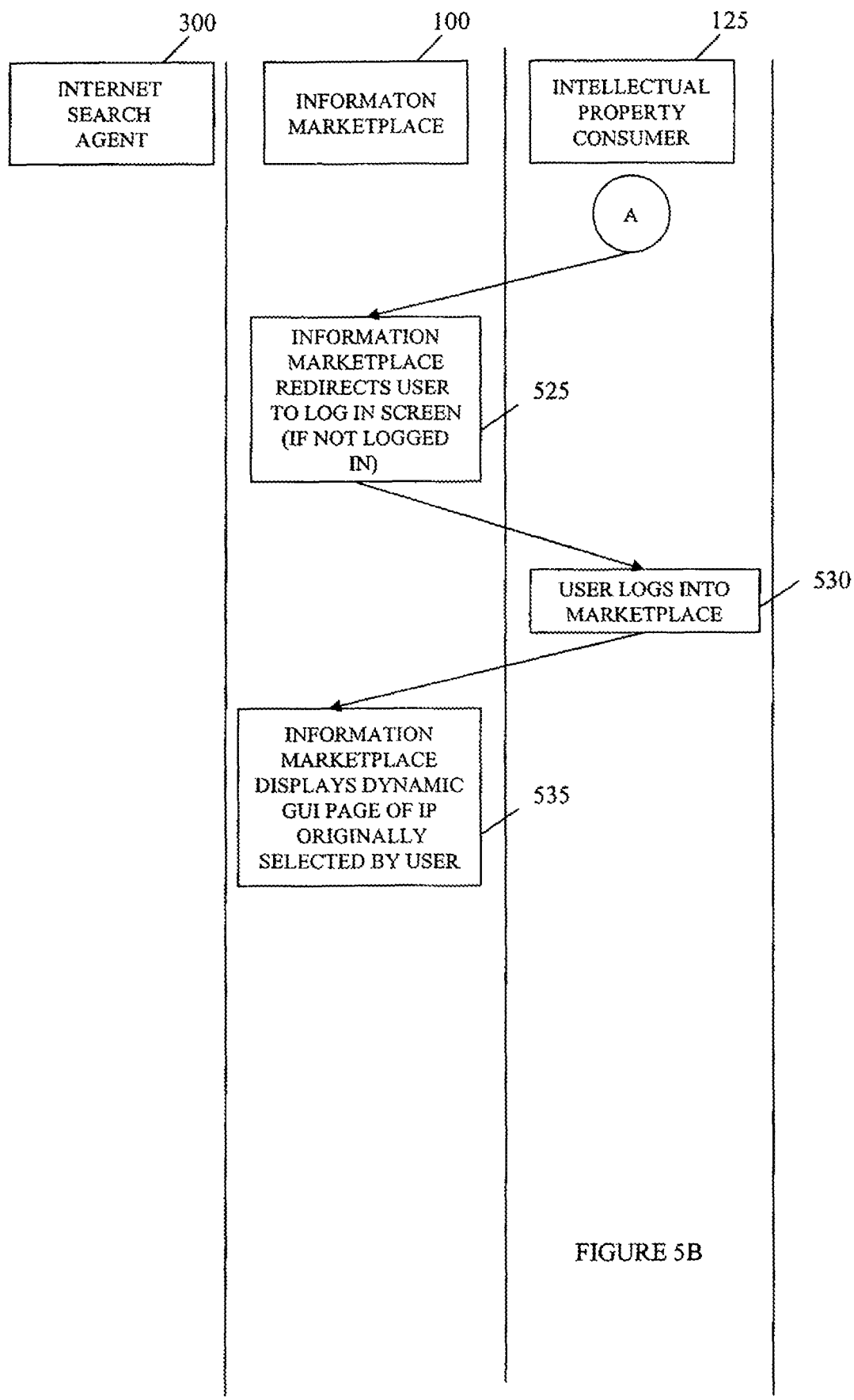

FIGS. 5A and 5B are swim lane diagrams of an embodiment showing steps of a user entering the Information Marketplace through an outside search site. Beginning at step 505, a user enters search criteria into a search engine. At step 510, the search engine searches internal indices (e.g., indices 145) that it had previously indexed, for metadata that matches the criteria. At step 515, the search engine may return matches (or "hits") to the user usually via a browser; some or all of which may be IP in the IM. At step 520, the user may select (e.g., by clicking on a link) an item within the IM. Instead of displaying the metadata file, the user may be forwarded to one of two pages, using known methods. At optional step 525, the user may be forwarded to the login screen page if the user is not currently logged into the IM, and optional step 530, the user logs into the IM. At step 535, the IM displays dynamic graphical user interface (GUI) of the IP for which the user originally selected. In this manner, the intellectual property may be located for commercial, private use or for a transaction.

While the invention has been described in terms of embodiments, those skilled in the art will recognize that the invention can be practiced with modifications and in the spirit and scope of the appended claims.

What is claimed is:

1. A computer implemented method of facilitating on-line searching of an information marketplace (IM), comprising the steps of:
　storing one or more metadata files having keyword value pairs from internal search indices of a website arranged within the IM to access intellectual property (IP) within the website, wherein the one or more metadata files are stored within one or more hyper-text markup files (HTML) HTML files in a directory accessible through a network;
　creating a master index file containing one or more links to each of the one or more HTML files;
　saving the master index file and the one or more HTML files in a searchable directory of the IM; and
　accessing at least one of the one or more HTML files by external web search engines via the one or more links to locate the IP, the accessing comprising:
　　redirecting search requests from the external web search engines to the searchable directory; and
　　executing the requests from the external web search engines on the searchable directory for the one or more HTML files;
　displaying a dynamic graphical user interface (GUI) of the located IP to a user;
　reproducing information about the IP in a format that the external web search engines can recognize and locate;
　forwarding users coming through the external web search engines to an IP graphical user interface instead of files that the external web search engines discovered;
　creating an authorized certificate during transactions to facilitate authentication of the user;
　creating a contract data token for the IP which specifies a first party public key of a first party and a second party public key of a second party;

receiving a digital signature of the contract data token for the IP by the first party private key of the first party to limit access to the IP beyond the first party and the second party; and crawling through the master index file with a search agent of the external web search engines to create search indices, wherein the IM provides for an owner of the IP to receive compensation of use or sale of the IP, the internal search indices are configured to be crawled by the external web search engines, the internal search indices have been previously indexed with stored metadata information and URLs to individual metadata documents, the IM handles a financial transaction between the owner of the IP and a buyer, and segregating the data into the layer of search data specifically for the external web search engines includes identifying the search agent.

2. The method of claim 1, further comprising using a browser to search the search indices for accessing the at least one of the one or more HTML files.

3. The method of claim 2, further comprising:
redirecting a search agent of the external web search engines to the searchable directory;
retrieving the master index file containing the one or more links; and
storing metadata information in search indices associated with the search agent for user searches.

4. The method of claim 3, further comprising:
entering search criteria into the search agent;
searching the search indices and associated metadata to match the search criteria; and
returning one or more matching results from the searching step.

5. The method of claim 4, further comprising:
selecting the one or more matching results by clicking on a link of an item of the IP within the IM;
forwarding the user a page which corresponds with the item of the IP within the IM; and
forwarding a request from the search agent to a separate directory with metadata in the IM,
wherein the one or more matching results are returned to the user via a web browser.

6. The method of claim 4, further comprising;
presenting a login screen to the IM when a selection is made from one of the one or more matching results, the selection being for the item of the IP within the IM;
logging into the IM through the login screen; and
providing at least one vault service to allow the user to specify a plurality of conditions such that the second party has read access to sharable portions of the IP, wherein the at least one vault service is a secure service via an existing public key infrastructure (PKI).

7. The method of claim 6, further comprising:
determining whether the user is logged into the IM; and
by-passing the presenting a login screen step if the user is already logged into the IM,
wherein the dynamic GUI of the located IP is displayed only after the user is logged into the IM,
the at least one vault service comprises accessing and updating a value and one or more data objects including files or personal data, and
the internal search indices comprises a core set of metadata.

8. The method of claim 1, wherein the method is implemented with the following:
the IM is coupled to a certificate authority which sends verifications including a digital certificate to the IM;
an IP consumer that issues a search request to the IM, receives search results from the IM, and purchases and receives IP; and
mapping a template to standard metadata that the IP includes within a vault,
wherein the IM is configured to disallow search agents from searching a plurality of directories, and
the IM includes a file for each IP stored which contains keyword information on the IP and an index file that contains a plurality of links to each IP metadata file.

9. The method of claim 1, wherein:
the internal search indices are associated with a collection of the keyword value pairs and pointers to the IP stored in the IM;
the keyword value pairs and the pointers are associated with a value;
the value is associated with a type of data, wherein the type of data categorizes the IP; and
the one or more HTML files contain at least one meta tag containing the keyword value pairs and a notification for search robots not to follow and index,
wherein the one or more HTML files are written to a predetermined directory that is accessible through the Internet,
the one or more HTML files each correspond to a separate IP within the IM, and
the value links to a list of a plurality of pointers to IP objects.

10. The method of claim 9, wherein an order of the list of the pointers to IP objects corresponds with consumption statistics for each of the IP objects.

11. The method of claim 10, further comprising providing read access from a first party to a second party for a sharable portion of the IP.

* * * * *